United States Patent
Kato et al.

(10) Patent No.: US 9,212,707 B2
(45) Date of Patent: *Dec. 15, 2015

(54) POWER TRANSMISSION DEVICE

(75) Inventors: Tadahiko Kato, Kosai (JP); Mikinori Matsui, Kosai (JP); Takehisa Yamada, Kosai (JP)

(73) Assignee: Univance Corporation, Shizuoka (JP)

( * ) Notice: Subject to any disclaimer, the term of this patent is extended or adjusted under 35 U.S.C. 154(b) by 211 days.

This patent is subject to a terminal disclaimer.

(21) Appl. No.: 13/818,934

(22) PCT Filed: Aug. 26, 2010

(86) PCT No.: PCT/JP2010/064479
§ 371 (c)(1),
(2), (4) Date: May 22, 2013

(87) PCT Pub. No.: WO2012/026021
PCT Pub. Date: Mar. 1, 2012

(65) Prior Publication Data
US 2013/0319811 A1 Dec. 5, 2013

(51) Int. Cl.
*F16D 41/07* (2006.01)
*F16D 41/08* (2006.01)

(52) U.S. Cl.
CPC .............. *F16D 41/07* (2013.01); *F16D 41/073* (2013.01); *F16D 41/084* (2013.01)

(58) Field of Classification Search
CPC ....... F16D 41/07; F16D 41/084; F16D 41/10; F16D 41/073
USPC ...... 192/43, 43.1, 43.2, 45.1, 41 A, 47, 48.92
See application file for complete search history.

(56) References Cited

U.S. PATENT DOCUMENTS

| | | | | |
|---|---|---|---|---|
| 3,165,183 A | * | 1/1965 | Clements | 192/103 R |
| 3,302,761 A | * | 2/1967 | Zlotek | 192/45.1 |

(Continued)

FOREIGN PATENT DOCUMENTS

| | | |
|---|---|---|
| JP | 61-130632 | 6/1986 |
| JP | H01-122326 | 8/1989 |

(Continued)

OTHER PUBLICATIONS

Search Report issued by European Patent Office for the counterpart European application EP 10856425, dated Dec. 10, 2013.

(Continued)

*Primary Examiner* — Richard Lorence
(74) *Attorney, Agent, or Firm* — Muramatsu & Associates

(57) ABSTRACT

The invention provides a power transmission device in which the switching mechanism and control operation can be simplified. Different directions are established for the relative rotation in which the first sprag engages the inner race and the outer race, and the relative rotation in which the second sprag engages the inner and outer races, whereby the inner retainer and the outer retainer are caused to move relative to each other about an axial center O by a load imparting device, and either the first sprag or the second sprag can be made to engage the inner race and the outer race. The combined retention of the first sprag and the second sprag by the inner retainer and the outer retainer actuates the load imparting device to allow the power transmission direction to be switched all at once, resulting in a simpler switching mechanism and control operation.

11 Claims, 10 Drawing Sheets

(56) References Cited

U.S. PATENT DOCUMENTS

| | | | |
|---|---|---|---|
| 4,645,047 A * | 2/1987 | Adolfsson | 192/12 B |
| 4,693,351 A * | 9/1987 | Adolfsson | 192/48.92 |
| 4,889,353 A * | 12/1989 | Hamada et al. | 280/233 |
| 5,343,992 A * | 9/1994 | Stark et al. | 192/45.1 |
| 8,753,240 B2 * | 6/2014 | Kato | 475/5 |

FOREIGN PATENT DOCUMENTS

| | | |
|---|---|---|
| JP | U 01-122326 | 8/1989 |
| JP | 05-509147 | 12/1993 |
| JP | U 05-96570 | 12/1993 |
| JP | H7-502799 | 3/1995 |
| JP | 10-323257 | 12/1998 |
| JP | 2005-059772 | 3/2005 |

OTHER PUBLICATIONS

English version of International Search Report for PCT/JP2010/064479.

* cited by examiner

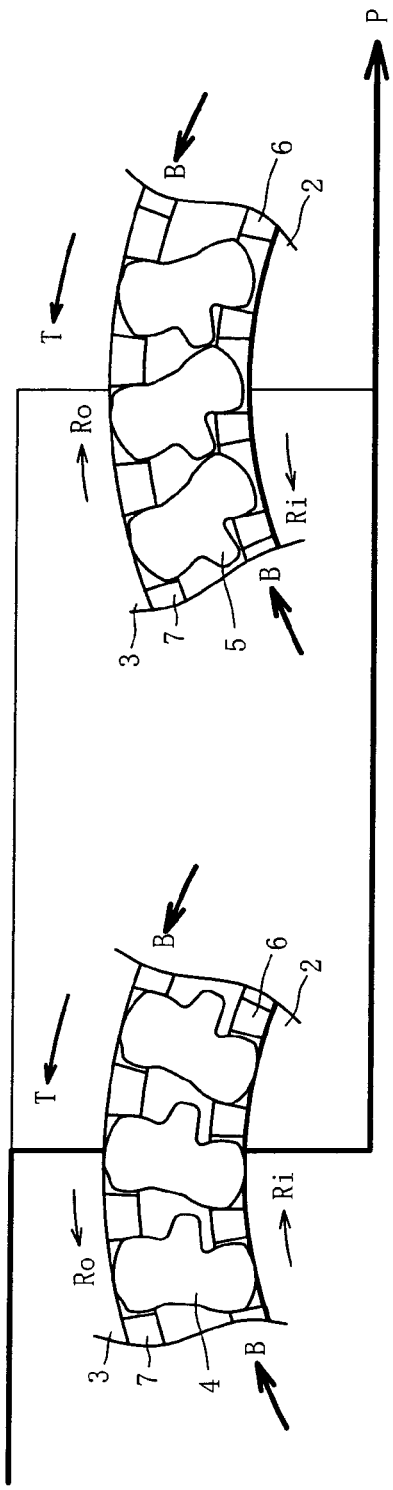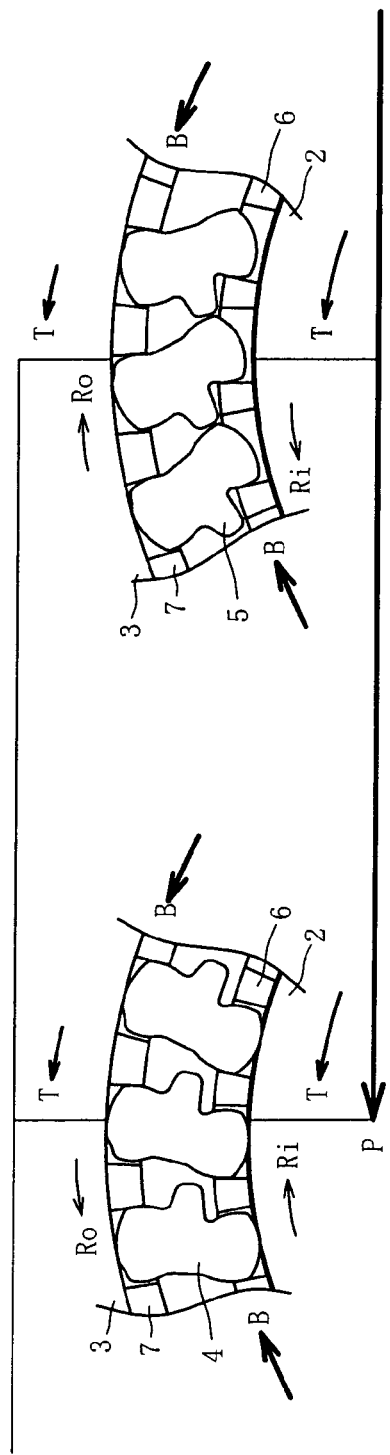
FIG. 9A
FIG. 9B

POWER TRANSMISSION DEVICE

This application is a national stage of International Application No. PCT/JP2010/064479 filed Aug. 26, 2010, the entire contents of which are incorporated herein by reference.

TECHNICAL FIELD

The present invention relates to a power transmission device capable of switching the transmitting direction of power, and relates more specifically to a power transmission device capable of simplifying a switching mechanism and control.

BACKGROUND ART

As a power transmission device constituted to include a pair of one-way clutches and capable of switching the transmitting direction of power (power transmission device), for example, one disclosed in Japanese Application Publication No. H10-323257 is known. In the power transmission device disclosed in this publication, relative rotation of an outer ring and a shaft is locked by engaging elements constituting a one-way clutch. The locked state of the relative rotation is released by operating an operation lever and moving an engaging/disengaging operation member that holds the engaging elements, and is switched to an idling state.

SUMMARY OF INVENTION

Technical Problem

However, according to the technology disclosed in Patent Literature 1, the engaging/disengaging operation member and the operation lever were arranged for each one-way clutch, and two engaging/disengaging operation members were arranged side by side between the outer ring and the shaft. Therefore, the operation levers were arranged for respective engaging/disengaging operation members, and in switching the locked state and idling state, it was necessary to operate the operation levers individually and to move the engaging/disengaging operation members individually for respective one-way clutches. When the operation levers were to be operated individually, it was necessary that a pair of one-way clutches did not cause double meshing, and there was a problem that the switching mechanism and control of the operation levers became complicated.

The present invention has been made in order to address the problems described above, and its object is to provide a power transmission device capable of simplifying the switching mechanism and control.

Solution to Problem and Advantageous Effects of Invention

According to the power transmission device of the first aspect, portions on the inner ring side of first sprags and second sprags are retained by an inner retainer, and portions on the outer ring side of the first sprags and the second sprags are retained by an outer retainer. Since the direction of relative rotation of the inner ring and the outer ring with which the first sprags engage with the inner ring and the outer ring and the direction of relative rotation of the inner ring and the outer ring with which the second sprags engage with the inner ring and the outer ring are different from each other, by relatively moving the inner retainer and the outer retainer around the axis by a load application device, the sprags engageable with the inner ring and the outer ring can be switched from the first sprags to the second sprags, and can be switched from the second sprags to the first sprags reversely.

Since the inner retainer and the outer retainer retain the first sprags and the second sprags together and the direction of relative rotation of the inner ring and the like with which the first sprags engage and the direction of relative rotation of the inner ring and the like with which the second sprags engage are different from each, other as described above, by relatively moving the inner retainer and the outer retainer around the axis by the load application device, the transmitting direction of the power can be switched together. Thus, there is an effect of simplifying the switching mechanism and control.

According to the power transmission device of the second aspect, when a load is applied by the load application device, the inner retainer and the outer retainer are relatively moved around the axis and engagement of at least one of the outer peripheral surface of the inner ring and the inner peripheral surface of the outer ring and the engaging surfaces of the first sprags and the second sprags is released, the first sprags or the second sprags are retained by the inner retainer and the outer retainer so that at least one of the outer peripheral surface of the inner ring and the inner peripheral surface of the outer ring and the engaging surfaces are put in brought into a non-contacting state. As a result, sliding of the engaging surfaces of the sprags over the outer peripheral surface of the inner ring and the inner peripheral surface of the outer ring can be prevented. Thus, in addition to the effect of the first aspect, it is capable of suppressing the dragging torque caused on the engaging surfaces of the sprags. Also, because sliding of the engaging surfaces of the sprags over the outer peripheral surface and the inner peripheral surface is prevented, it is capable of suppressing occurrence of wear, heat generation and the like.

Also, since the first sprags or the second sprags whose engagement has been released are retained in a non-contacting state with respect to the outer peripheral surface of the inner ring and the inner peripheral surface of the outer ring, the first sprags or the second sprags can be prevented from unintentionally engaging with the inner ring and the outer ring. Thus, there is an effect of securing surety of switching of the power transmission by relative movement of the inner retainer and the outer retainer.

According to the power transmission device of the third aspect, with respect to the first sprags or the second sprags, when the engaging surfaces of one of the first sprags and the second sprags are engaged with the outer peripheral surface of the inner ring and the inner peripheral surface of the outer ring, the engaging surfaces of the other of the first sprags or the second sprags and at least one of the outer peripheral surface of the inner ring and the inner peripheral surface of the outer ring are brought into a non-contacting state. Therefore, when one group of the first sprags and the second sprags is engaged with the inner ring and the outer ring, the other group of the first sprags or the second sprags can be prevented from unintentionally engaging with the inner ring and the outer ring. Thus, in addition to the effect of the first and second aspects, it is possible to achieve an effect that double locking in which both of the first sprags and the second sprags engage with the inner ring and the outer ring can be securely prevented.

According to the power transmission device of the fourth aspect, since at least one of the inner retainer and the outer retainer is energized by a first energizing member and the inner retainer and the outer retainer are energized to the opposite direction of the direction of relative movement of the inner retainer and the outer retainer by the load application device, when the load application device is not driven, the relative position of the inner retainer and the outer retainer is restricted by the energizing force generated by the first energizing member. In this connection, because the load application device has to be operated only when the relative position of the inner retainer and the outer retainer is to be changed, the time for driving the load application device can be reduced, and, in addition to the effect of any of the first to third aspects, there is an effect that the energy consumption required for driving the load application device can be suppressed.

According to the power transmission device of the fifth aspect, the inner retainer or the outer retainer includes a first retaining section and a second retaining section separated from each other in the axial direction, the first sprags are retained by the first retaining section, and the second sprags are retained by the second retaining section. Also, the first retaining section and the second retaining section are constituted so as to be capable of relatively moving in the circumferential direction, and the first retaining section and the second retaining section are energized in one direction in the circumferential direction by a second energizing member. As a result, by the energizing force of the second energizing member, a first surface and a second surface formed in the first retaining section and the second retaining section abut upon each other, and relative movement of the first retaining section and the second retaining section to one circumferential direction is restricted. As a result, the first retaining section and the second retaining section can be integrally moved by the energizing force of the second energizing member, the first sprags retained by the first retaining section and the second sprags retained by the second retaining section can be tilted by applying a load by the load application device.

Here, when one group of the first sprags and the second sprags engage with the inner ring and the outer ring by relative movement in the circumferential direction of the inner retainer and the outer retainer, the other group of the first sprags or the second sprags are retained by the inner retainer and the outer retainer, and engagement with the inner ring and the like has been released. When the inner retainer and the outer retainer are formed into one piece respectively, if one group of the first sprags and the second sprags engaging with the inner ring and the outer ring is tilted so as to be engaged more strongly, the inner retainer and the outer retainer are pushed by the tilting, and the inner retainer and the outer retainer relatively move further. Then, the other group of the first sprags or the second sprags may come off from the inner retainer and the outer retainer, and the inner retainer and the outer retainer may be damaged.

On the other hand, according to the power transmission of the fifth aspect, since the first retaining section and the second retaining section are constituted so as to be capable of relatively moving in the circumferential direction, when one group of the first sprags and the second sprags engaging with the inner ring and the outer ring is tilted so as to be engaged more strongly, only one of the first retaining section and the second retaining section relatively moves with respect to the other of the first retaining section or the second retaining section by the tilting. As a result, the other of the first retaining section and the second retaining section can be prevented from being affected, and in addition to the effect of any of the first to fourth aspects, there is an effect that the other group of the first sprags or the second sprags can be prevented from coming off from the inner retainer and the outer retainer and the inner retainer and the outer retainer can be prevented from being damaged.

According to the power transmission device of the sixth aspect, when engagement of at least one of the outer peripheral surface of the inner ring and the inner peripheral surface of the outer ring and the engaging surfaces of the first sprags and the second sprags is released by relative movement of the inner retainer and the outer retainer and the first sprags and the second sprags are tilted, the first sprags or the second sprags abut upon each other, and the first sprags and the second sprags are held by the inner retainer and the outer retainer. As a result, further relative movement of the inner retainer and the outer retainer retaining the first sprags and the second sprags is also restricted. Accordingly, it is not required to arrange a positioning member and the like restricting the relative movement amount of the inner retainer and the outer retainer, and in addition to the effect of any of the first to fifth aspects, there is an effect that the constitution of the device can be simplified.

BRIEF DESCRIPTION OF DRAWINGS

FIG. 9 (a) is a schematic drawing schematically showing the inner structure of the power transmission device during normal traveling, and (b) is a schematic drawing schematically showing the inner structure of the power transmission device in shifting up.

DESCRIPTION OF EMBODIMENTS

Figure 1:
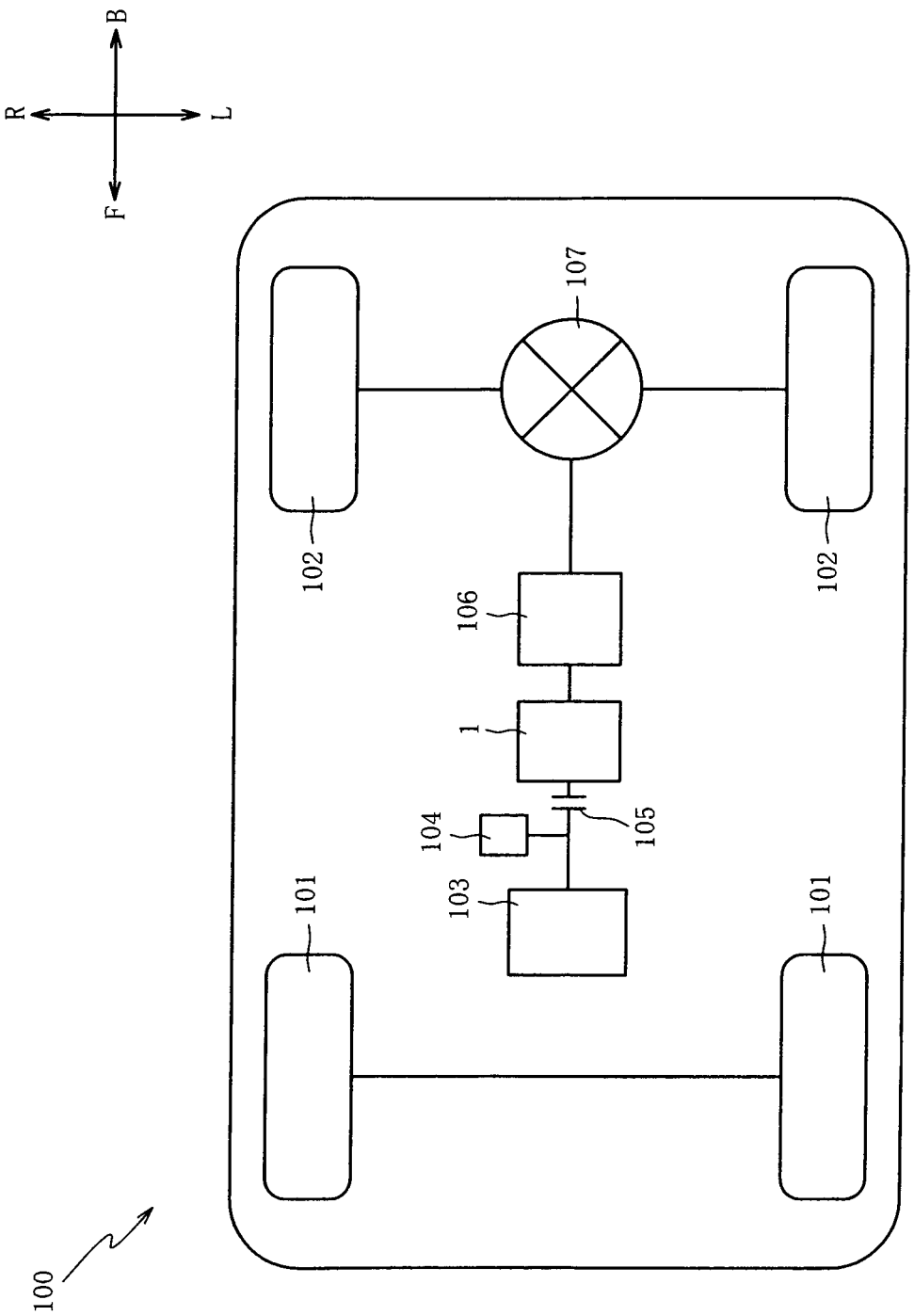
FIG. 1 is a schematic drawing of a vehicle on which a power transmission device in an embodiment of the present invention is mounted.

Below, preferred embodiments of the present invention will be described referring to the attached drawings. First, a constitution of a power transmission device 1 in an embodiment of the present invention will be described referring to FIG. 1 to FIG. 4. FIG. 1 is a schematic drawing of a vehicle 100 on which the power transmission device 1 in an embodiment of the present invention is mounted.

As shown in FIG. 1, the vehicle 100 mainly includes front wheels 101 and rear wheels 102, an engine 103 and a motor 104 as a power source, the power transmission device 1 and a transmission 106 transmitting the power of the engine 103 and the motor 104 to the rear wheels 102, and is constituted so that the rear wheels 102 can be driven by the power of the engine 103 and the motor 104. A main clutch 105 is disposed in a power transmission route from the engine 103 and the motor 104 to the power transmission device 1, and is a device for connecting and disconnecting the power transmission route. The transmission 106 is a device for outputting the power of the engine 103 and the motor 104 at a predetermined transmission gear ratio, and output of the transmission 106 is transmitted to the rear wheels 102 via a differential gear 107.

Figure 2:
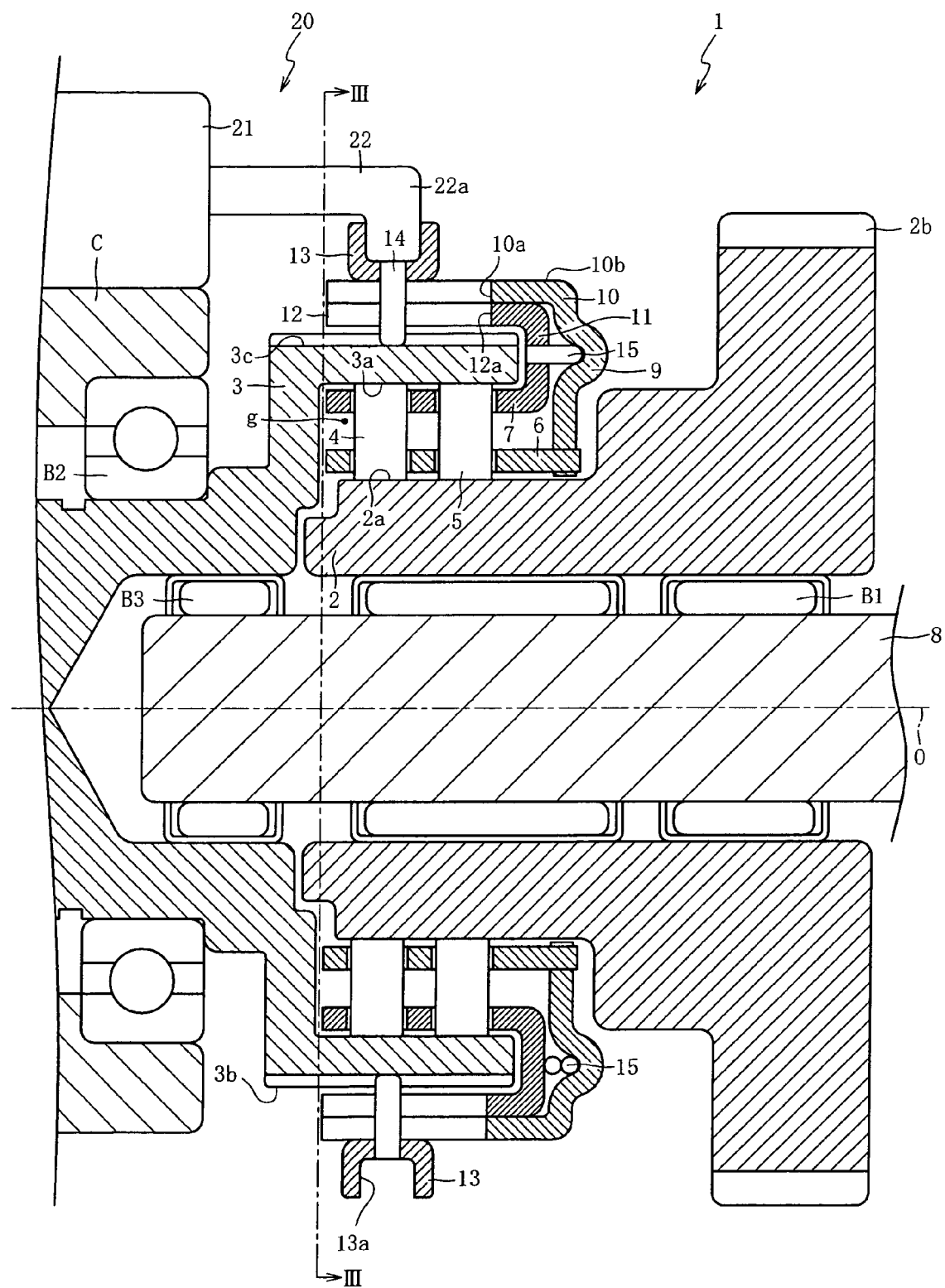
FIG. 2 is an axial cross-sectional view of the power transmission device.
Figure 3:
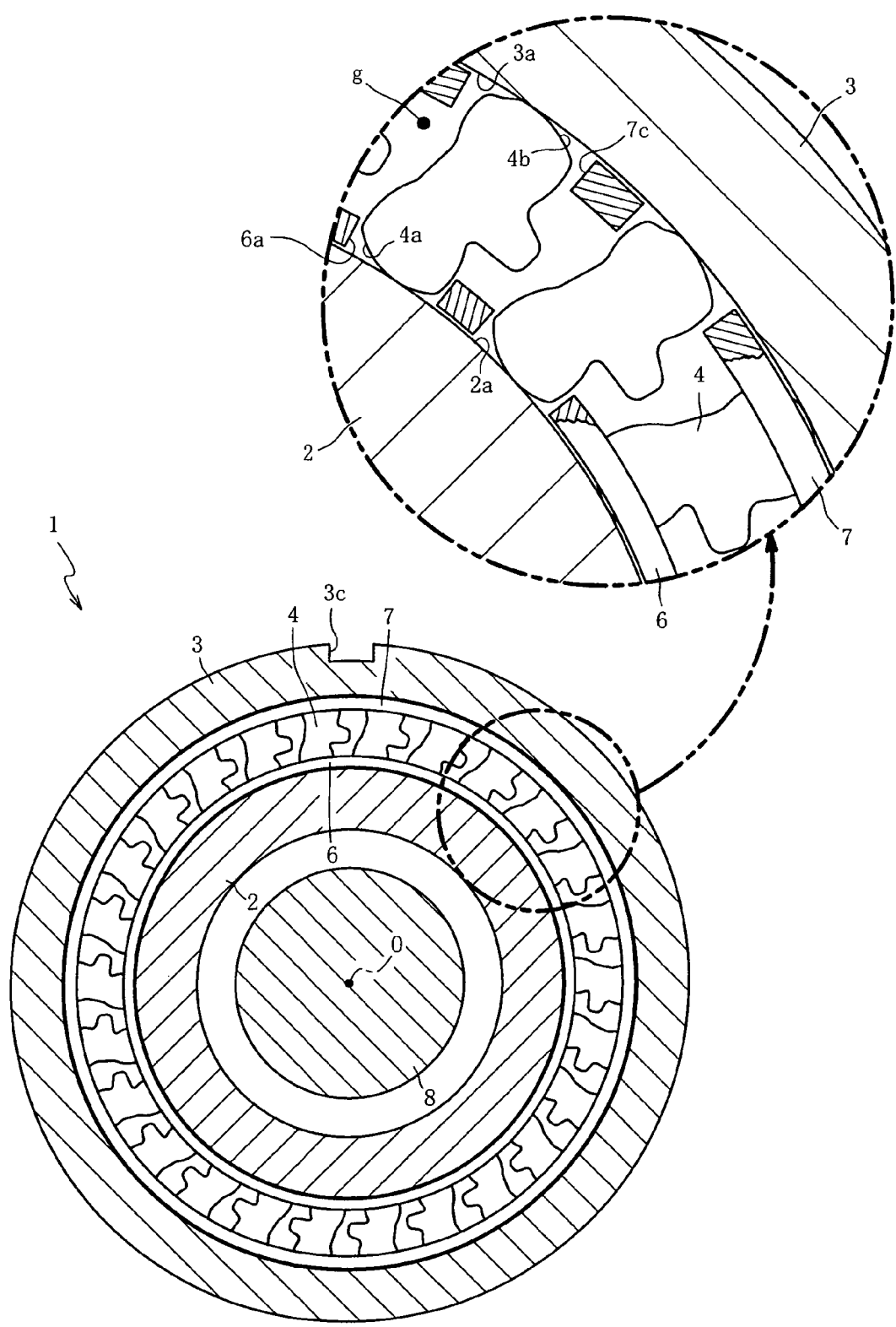
FIG. 3 is a peripheral cross-sectional view of the power transmission device taken from line of FIG. 2.

Next, the detailed constitution of the power transmission device 1 will be described referring to FIG. 2 to FIG. 4. FIG. 2 is an axial cross-sectional view of the power transmission device 1, and FIG. 3 is a peripheral cross-sectional view of the power transmission device 1 taken from line of FIG. 2. Also, in FIG. 3, in order to simplify the drawing, illustration of second sprags 5 (on the back side of the paper surface of FIG. 3) juxtaposed with first sprags 4 is omitted.

As shown in FIG. 2, the power transmission device 1 is constituted to mainly include an inner ring 2, an outer ring 3 surrounding the outer periphery of the inner ring 2, and the first sprags 4 and the second sprags 5 to switch transmission of the power of the outer ring 3 and the inner ring 2.

The inner ring 2 functions to transmit the drive force from the engine 103 (refer to FIG. 1) and the motor 104 to the rear wheels 102, has an outer peripheral surface 2a with a circular cross-sectional shape as shown in FIG. 2 and FIG. 3, and is constituted to be rotatable around the axis O. Also, in the present embodiment, the inner ring 2 is formed into a generally annular shape, and is supported by a center shaft 8 formed into a cylindrical shape via a roller bearing B1. In the inner ring 2, a gear 2b rotating around the axis O is extended in the axial direction (to the right in FIG. 2), therefore rotation can be transmitted to the inner ring 2 via the gear 2b, and rotation of the inner ring 2 is outputted via the gear 2b.

The outer ring 3 functions to transmit the drive force to the rear wheels 102 (refer to FIG. 1) along with the inner ring 2, has an inner peripheral surface 3a of a circular cross-sectional shape opposing the outer peripheral surface 2a of the inner ring 2, and is constituted to be rotatable around the axis O similarly to the inner ring 2. The outer ring 3 in the present embodiment is formed into a generally annular shape, is supported by a case C via a ball bearing B2, and is supported by the center shaft 8 via a roller bearing B3 as shown in FIG. 2.

The first sprag 4 functions to restrict relative rotation of the inner ring 2 and the outer ring 3, has engaging surfaces 4a, 4b (refer to FIG. 3) respectively contacting the outer peripheral surface 2a and the inner peripheral surface 3a, and a plurality of which are disposed at a regular interval in the circumferential direction in an accommodation space g between the outer peripheral surface 2a and the inner peripheral surface 3a. The first sprag 4 is constituted so that the engaging surfaces 4a, 4b can engage with the outer peripheral surface 2a of the inner ring 2 and the inner peripheral surface 3a of the outer ring 3 by relative rotation of the inner ring 2 and the outer ring 3 in one direction.

The second sprag 5 functions to restrict relative rotation of the inner ring 2 and the outer ring 3 along with the first sprag 4, has engaging surfaces 5a, 5b (refer to FIG. 5) respectively contacting the outer peripheral surface 2a of the inner ring 2 and the inner peripheral surface 3a of the outer ring 3, and a plurality of which are disposed at a regular interval in the circumferential direction along with the first sprags 4 in the accommodation space g between the outer peripheral surface 2a of the inner ring 2 and the inner peripheral surface 3a of the outer ring 3. The second sprag 5 is constituted so that the engaging surfaces 5a, 5b can engage with the outer peripheral surface 2a of the inner ring 2 and the inner peripheral surface 3a of the outer ring 3 by relative rotation of the inner ring 2 and the outer ring 3 in the other direction.

Figure 4A:
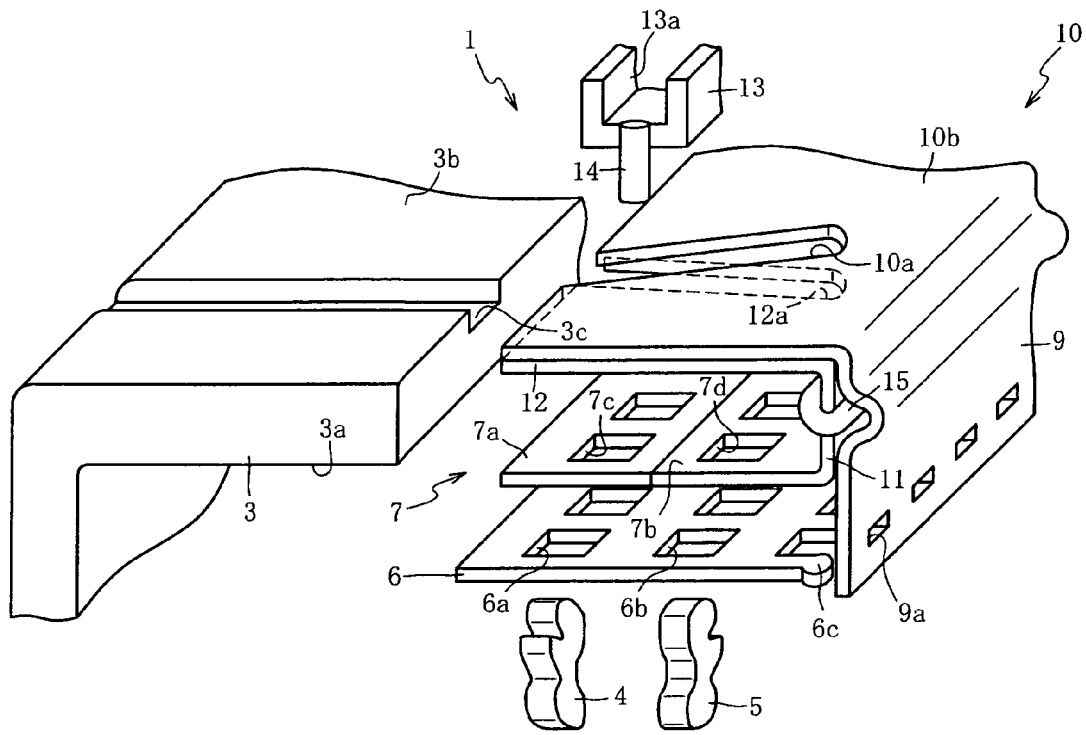
FIG. 4 (a) is a set of exploded perspective views of a part of the power transmission device, (b) is a schematic drawing showing the positional relation of a first cam groove and a second cam groove and an engaging element, and (c) is a schematic drawing showing the relation of the reciprocating motion of the engaging element and the relative movement of the first cam groove and the second cam groove.
Figure 4B:
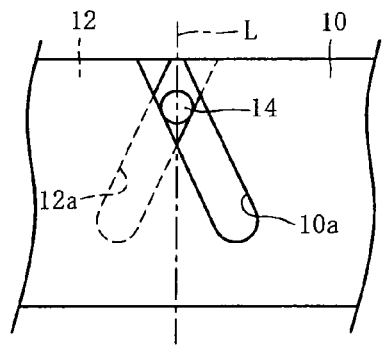
Figure 4C:
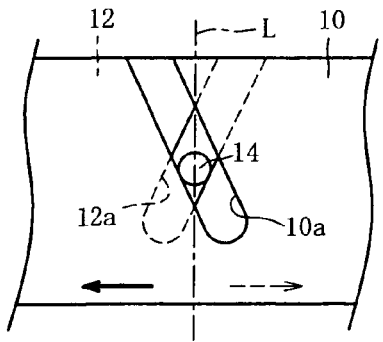

An inner retainer 6 is a member of a cylindrical shape in which pockets 6a, 6b (refer to FIG. 4 (a)) are penetratingly formed by plural numbers in the circumferential direction, retains portions on the inner ring 2 side of the first sprags 4 inserted to the pockets 6a and the second sprags 5 inserted to the pockets 6b, and is supported by the axis O side of a first disk section 9. The first disk section 9 is a member formed into a disk shape crossing the axis O direction, and is disposed on the outer periphery side of the inner ring 2 outside the accommodation space g.

A first rotating section 10 has a cylindrical shape coaxial with the inner ring 2, is extended from the outer periphery of the first disk section 9 in the direction parallel to the axis O, and is constituted to be rotatable integrally with the inner retainer 6. In the present embodiment, the first rotating section 10 is disposed so as to oppose the outer peripheral surface 2a of the inner ring 2. Thus, the length of the inner ring 2 and the first rotating section 10 in the axis O direction can be shortened, and the power transmission device 1 can be made compact.

An outer retainer 7 is a member of a cylindrical shape in which pockets 7c, 7d (refer to FIG. 4 (a)) are penetratingly formed by plural numbers in the circumferential direction, retains portions on the outer ring 3 side of the first sprags 4 inserted to the pockets 7c and the second sprags 5 inserted to the pockets 7d, and is supported by the axis O side of a second disk section 11 that is disposed so as to face the first disk section 9. The second disk section 11 is a member formed into a disk shape crossing the axis O direction, and is disposed outside the accommodation space g.

A second rotating section 12 has a cylindrical shape coaxial with the inner ring 2, is positioned between the inner peripheral surface 3a of the outer ring 3 and the first rotating section 10, is extended from the outer periphery of the second disk section 11 in the direction parallel to the axis O, and is constituted to be rotatable integrally with the outer retainer 7. In the first rotating section 10 and the second rotating section 12, a first cam groove 10a and a second cam groove 12a are penetratingly bored respectively in the peripheral surface along the axis O direction. In the present embodiment, the first rotating section 10 and the second rotating section 12 have portions overlapping with each other along the axis O direction, and the first cam groove 10a and the second cam groove 12a are formed in the overlapping portion.

A load application device 20 is constituted to include an actuator 21 and a reciprocating section 22. The actuator 21 is a power source generating the load applied to the inner retainer 6 and the outer retainer 7, and is fixed to the case C. The reciprocating section 22 is a portion transmitting the power of the actuator 21 to the inner retainer 6 and the outer retainer 7, is disposed in parallel with the axis O, and is reciprocated in parallel with the axis O by driving the actuator 21.

An annular member 13 is disposed along the peripheral surface 10b of the first rotating section 10, includes a first engaging section 13a formed into a shape of a continuous groove in the circumferential direction of the outer peripheral surface, and is constituted to be rotatable along the peripheral surface 10b of the first rotating section 10. The first engaging section 13a is a portion with which a second engaging section 22a projected toward the axis from the distal end of the reciprocating section 22 that is formed into an arm shape is engaged to be slidable in the circumferential direction. The annular member 13 includes an engaging element 14 projected toward the axis O. The engaging element 14 passes through the first cam groove 10a penetratingly bored in the first rotating section 10, and is engaged with the second cam groove 12a penetratingly bored in the second rotating section 12. In the present embodiment, a groove 3c is formed on an outer peripheral surface 3b of the outer ring 3 in parallel with the axis O, and the engaging element 14 is engaged with the groove 3c at the distal end thereof while passing through the first cam groove 10a and the second cam groove 12a.

Since the engaging element 14 engages with the groove 3c, the first cam groove 10a and the second cam groove 12a as described above, when the outer ring 3 rotates around the axis O, the engaging element 14 engaging with the groove 3c formed on the outer peripheral surface 3b of the outer ring 3 and the annular member 13 are rotated around the axis O. In response to the rotation, the first rotating section 10 and the second rotating section 12 in which the engaging element 14 passes through the first cam groove 10a and the second cam groove 12a are also rotated around the axis O. At the same time, the inner retainer 6 and the outer retainer 7 integrated to the first rotating section 10 and the second rotating section 12 as well as the first sprags 4 and the second sprags 5 retained by them are rotated in the circumferential direction.

Next, the power transmission device 1 will be described in more detail referring to FIG. 4. FIG. 4 (a) is an exploded perspective view of a part of the power transmission device 1, FIG. 4 (b) is a schematic drawing showing the positional relation of the first cam groove 10a, the second cam groove 12a and the engaging element 14, and FIG. 4 (c) is a schematic drawing showing the relation of the reciprocating motion of the engaging element 14 and the relative movement of the first cam groove 10a and the second cam groove 12a.

As shown in FIG. 4 (a), the first cam groove 10a and the second cam groove 12a are formed on the peripheral surfaces of the first rotating section 10 and the second rotating section 12 in shapes different from each other. More specifically, as shown in FIG. 4 (b), the first cam groove 10a and the second cam groove 12a cross a straight line L parallel to the axis O, and are formed so as to depart from each other as they depart (downward in FIG. 4 (b)) from the actuator 21 (refer to FIG. 2). Thus, when the actuator 21 is driven and the reciprocating section 22 is moved to the direction departing from the actuator 21 (to the right in FIG. 4 (a)), the second engaging section 22a (refer to FIG. 2) engages with the first engaging section 13a, the annular member 13 is moved to the direction departing from the actuator 21 along the peripheral surface 10b of the first rotating section 10, and the engaging element 14 projectingly arranged on the annular member 13 moves to the direction departing from the actuator 21 through the first cam groove 10a and the second cam groove 12a.

Since the first cam groove 10a and the second cam groove 12a diagonally cross a straight line L that is parallel to the axis O and are formed so as to be apart from each other as they depart from the actuator 21 (refer to FIG. 2) as described above, when the engaging element 14 moves through the first cam groove 10a and the second cam groove 12a to the direction departing from the actuator 21 (downward in FIG. 4 (b)), the first rotating section 10 and the second rotating section 12 are relatively moved in the circumferential direction around the axis O (the arrow direction shown in FIG. 4 (c)) as shown in FIG. 4 (c). When the actuator 21 is driven from this state and the engaging element 14 moves through the first cam groove 10a and the second cam groove 12a to the direction approaching the actuator 21 (upward in FIG. 4 (c)), the first rotating section 10 and the second rotating section 12 are relatively moved to the opposite direction (the direction opposite of the arrow direction shown in FIG. 4 (c)). Since the inner retainer 6 and the outer retainer 7 have been connected to the first rotating section 10 and the second rotating section 12, the inner retainer 6 and the outer retainer 7 are relatively moved accompanying the relative movement of the first rotating section 10 and the second rotating section 12.

Description will be made returning to FIG. 2. In the present embodiment, a first energizing member 15 (refer to FIG. 2 and FIG. 4 (a)) is provided which energizes the first disk section 9 and the second disk section 11 to the circumferential direction around the axis O. The first energizing member 15 is constituted of a twisting coil spring of an annular shape, is disposed between the first disk section 9 and the second disk section 11 along the first disk section 9 and the second disk section 11, and both ends thereof are locked to the first disk section 9 and the second disk section 11 respectively. Also, the first rotating section 10 and the second rotating section 12 are set so as to be energized by the first energizing member 15 to the opposite direction of the relative movement direction when the engaging element 14 moves to the direction departing from the actuator 21.

Thus, when the engaging element 14 is positioned near the actuator 21, even when the actuator 21 is not driven, the first rotating section 10 and the second rotating section 12 can be maintained at a predetermined position by the energizing force of the first energizing member 15. Since the load application device 20 only has to be driven when the first rotating section 10 and the second rotating section 12 are relatively moved from this position, energy consumption required for driving the load application device 20 can be suppressed.

Also, as shown in FIG. 4 (a), the inner retainer 6 is fixed with the distal end 6c thereof being inserted to a locking hole 9a formed on the axis side of the first disk section 9. Thus, assembling of the inner retainer 6 can be facilitated. Also, the outer retainer 7 is constituted to include a first retaining section 7a retaining the first sprags 4, and a second retaining section 7b separated from the first retaining section 7a in the axial direction and retaining the second sprags 5. In the first retaining section 7a and the second retaining section 7b, the pockets 7c, 7d are arrayed at equal intervals in the circumferential direction, and the first sprags 4 and the second sprags 5 are inserted to the pockets 7c, 7d.

Figure 5A:
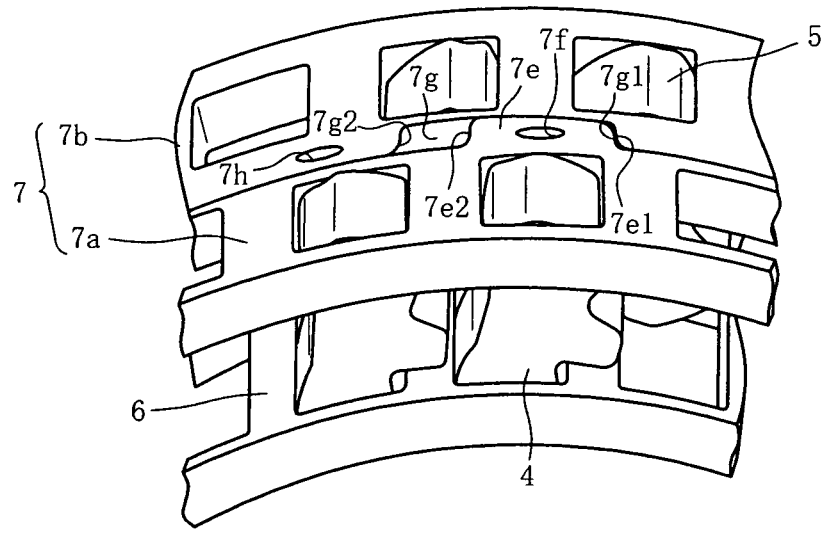
FIG. 5 (a) is a perspective view of an essential part of the first retaining section and the second retaining section whose relative movement is restricted, (b) is a peripheral cross-sectional view of the first retaining section, and (c) is a peripheral cross-sectional view of the second retaining section.
Figure 5B:
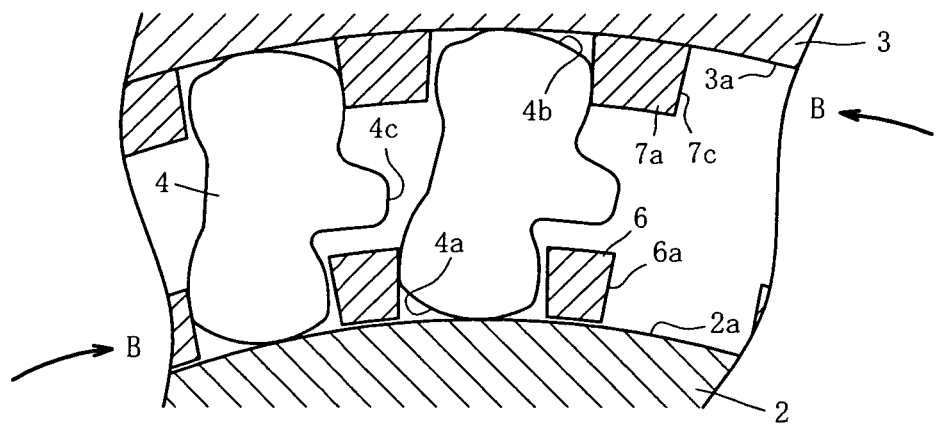
Figure 5C:
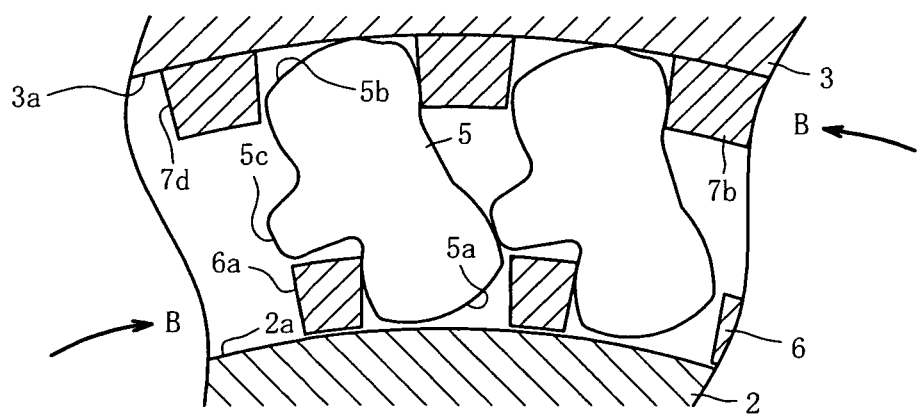

Next, the constitution and motion of the first retaining section 7a and the second retaining section 7b will be described referring to FIG. 5 to FIG. 8. First, the constitution of the first retaining section 7a and the second retaining section 7b will be described referring to FIG. 5 (a). FIG. 5 (a) is a perspective view of an essential part of the first retaining section 7a and the second retaining section 7b whose relative movement is restricted. Also, in FIG. 5 to FIG. 8, illustration of a part of the first sprags 4 and the second sprags 5 retained by the first retaining section 7a and the second retaining section 7b is omitted, and the drawing is simplified.

As shown in FIG. 5, in the first retaining section 7a, a projection 7e is arranged so as to project toward the second retaining section 7b on the surface that opposes the second retaining section 7b. In the projection 7e, a first surface 7e1 is formed on one side in the circumferential direction, and a third surface 7e2 is formed on the other side. In the second retaining section 7b, a recess 7g receiving the projection 7e is formed on the surface that opposes the first retaining section 7a. The length in the circumferential direction of the recess 7g is set to be longer than the length in the circumferential direction of the projection 7e. In the recess 7g, a second surface 7g1 capable of abutting upon the first surface 7e1 is formed on one side in the circumferential direction, and a fourth surface 7g2 capable of abutting upon the third surface 7e2 is formed on the other side. Although the first retaining section 7a and the second retaining section 7b can move relatively within a range the projection 7e can move inside the recess 7g, by abutment of the second surface 7g1 of the recess 7g upon the first surface 7e1 of the projection 7e, relative movement of the first retaining section 7a and the second retaining section 7b to one circumferential direction is restricted. Also, by abutment of the fourth surface 7g2 of the recess 7g upon the third surface 7e2 of the projection 7e, relative movement of the first retaining section 7a and the second retaining section 7b to the other circumferential direction is restricted.

Locking sections 7f, 7h are formed each of the first retaining section 7a and the second retaining section 7b, and are portions to which both ends of a second energizing member (not shown) are locked. In the present embodiment, the locking sections 7f, 7h are formed penetratingly from the inner peripheral surface to the outer peripheral surface of the first retaining section 7a and the second retaining section 7b, and the second energizing member is formed of a twisting coil spring. In the second energizing member, both ends are locked to the locking sections 7f, 7h, and annular portions are disposed between the first sprags 4 and the second sprags 5 along the inner peripheral surface of the outer retainer 7. As a result, the second energizing member energizes the first retaining section 7a and the second retaining section 7b to one side in the circumferential direction so that the first surface 7e1 of the first retaining section 7a abuts upon the second surface 7g1 of the second retaining section 7b. When a load is applied to the second retaining section 7b by the load application device 20 (refer to FIG. 2) via the second rotating section 12 (refer to FIG. 4 (a)) and the second disk section 11, the first retaining section 7a follows the second retaining section 7b by the energizing force of the second energizing member (not shown), and the first retaining section 7a and the second retaining section 7b can be moved integrally as the outer retainer 7.

Next, the motion of the first sprags 4 and the second sprags 5 when the inner retainer 6 and the outer retainer 7 are relatively moved to one circumferential direction will be described referring to FIG. 5 (b) and FIG. 5 (c). FIG. 5 (b) is a peripheral cross-sectional view of the first retaining section 7a, and FIG. 5 (c) is a peripheral cross-sectional view of the second retaining section 7b. Also, in the present embodiment, it is to be understood that the inner retainer 6 and the outer retainer 7 are relatively moved to the position shown in FIG. 5 by the energizing force of the first energizing member 15 (refer to FIG. 2 and FIG. 4 (a)).

As shown in FIG. 5 (b), a load of the arrow B direction is applied to each of the inner retainer 6 and the outer retainer 7 (the first retaining section 7a) by the first energizing member 15 described above, the inner retainer 6 and the outer retainer 7 (the first retaining section 7a) are relatively moved, and the first sprags 4 are tilted, the first sprags 4 being inserted to the pockets 6a, 7c of the inner retainer 6 and the first retaining section 7a. Thus, the engaging surfaces 4a, 4b of the first sprags 4 can be made to contact the outer peripheral surface 2a of the inner ring 2 and the inner peripheral surface 3a of the outer ring 3, and the inner ring 2 and the outer ring 3 can be made a state engageable with the first sprags 4. Then, the first sprags 4 are positioned at a predetermined interval in the circumferential direction between the outer peripheral surface 2a and the inner peripheral surface 3a opposing to each other without abutment of an abutting section 4c arranged so as to project toward the first sprag 4 positioned adjacently.

Next, the motion of the first sprags 4 and the second sprags 5 when the inner retainer 6 and the outer retainer 7 are relatively moved to one circumferential direction will be described referring to FIG. 5 (b) and FIG. 5 (c). FIG. 5 (b) is a peripheral cross-sectional view of the first retaining section 7a, and FIG. 5 (c) is a peripheral cross-sectional view of the second retaining section 7b. Also, in the present embodiment, it is assumed that the inner retainer 6 and the outer retainer 7 are relatively moved to the position shown in FIG. 5 by the energizing force of the first energizing member 15 (refer to FIG. 2 and FIG. 4 (a)).

As shown in FIG. 5 (b), a load of the arrow B direction is applied to each of the inner retainer 6 and the outer retainer 7 (the first retaining section 7a) by the first energizing member 15 described above, the inner retainer 6 and the outer retainer 7 (the first retaining section 7a) are relatively moved, and the first sprags 4 inserted in the pockets 6a, 7c are tilted. Thus, the engaging surfaces 4a, 4b of the first sprags 4 contact the outer peripheral surface 2a of the inner ring 2 and the inner peripheral surface 3a of the outer ring 3, and the inner ring 2 and the outer ring 3 become engageable with the first sprags 4. In this situation, the first sprags 4 are positioned at a predetermined interval in the circumferential direction between the outer peripheral surface 2a and the inner peripheral surface 3a opposing to each other without abutment of an abutting section 4c arranged so as to project toward the first sprag 4 positioned adjacently.

Also, since the second retaining section 7b moves integrally with the first retaining section 7a as described above, when a load of the arrow B direction is applied to each of the inner retainer 6 and the outer retainer 7 (the second retaining section 7b) as shown in FIG. 5 (b), the inner retainer 6 and the outer retainer 7 (the second retaining section 7b) are relatively moved, and the second sprags 5 inserted in the pockets 6a, 7d are tilted. Thus, at least one of the outer peripheral surface 2a of the inner ring 2 and the inner peripheral surface 3a of the outer ring 3 and the engaging surfaces 5a, 5b of the second sprags 5 are put in brought into a non-contacting state. As a result, the inner ring 2 and the outer ring 3 and the second sprags 5 become unable to engage with each other.

When power is transmitted to the inner ring 2 or the outer ring 3 in a state shown in FIG. 5 (b) and the inner ring 2 rotates clockwise of FIG. 5 or the outer ring 3 rotates counterclockwise of FIG. 5, the engaging surfaces 4a, 4b of the first sprags 4 engage with the outer peripheral surface 2a of the inner ring 2 and the inner peripheral surface 3a of the outer ring 3, and the power is transmitted via the first sprags 4.

On the other hand, in the second sprags 5, since at least one of the outer peripheral surface 2a of the inner ring 2 and the inner peripheral surface 3a of the outer ring 3 and the engaging surfaces 5a, 5b of the second sprags 5 are brought into a non-contacting state, the engaging surfaces 5a, 5b of the second sprags 5 are prevented from sliding against the outer peripheral surface 2a of the inner ring 2 and the inner peripheral surface 3a of the outer ring 3. Thus, generation of the dragging torque in the engaging surfaces 5a, 5b of the second sprags 5 can be prevented. Also, since the engaging surfaces 5a, 5b of the second sprags 5 are prevented from sliding against the outer peripheral surface 2a of the inner ring 2 and the inner peripheral surface 3a of the outer ring 3, occurrence of wear, heat generation and the like can be suppressed.

Also, in a state the first sprags 4 engage with the outer peripheral surface 2a of the inner ring 2 and the inner peripheral surface 3a of the outer ring 3 (refer to FIG. 5 (b)), the relative position of the inner retainer 6 and the outer retainer 7 is determined, and at this time, the engaging surfaces 5a of the second sprags 5 are brought into a non-contacting state with respect to the outer peripheral surface 2a of the inner ring 2 as shown in FIG. 5 (c). As a result, unintentional engagement of the second sprags 5 with the inner ring 2 and the outer ring 3 can be prevented when the first sprags 4 are engaged with the inner ring 2 and the outer ring 3. Thus, double locking in which both of the first sprags 4 and the second sprags 5 engage with the inner ring 2 and the outer ring 3 can be securely prevented.

Also, when the torque transmitted via the first sprags 4 increases and the inner retainer 6 and the outer retainer 7 are relatively moved to the arrow B direction, as shown in FIG. 5 (c), in the second sprag 5, an abutting section 5c abuts upon the second sprag 5 positioned adjacently, and further tilting is restricted. As a result, the inner retainer 6 and the outer retainer 7 (the second retaining section 7b) go into a state of holding the second sprags 5, and further relative movement of the inner retainer 6 and the outer retainer 7 (the second retaining section 7b) is restricted. Accordingly, it is not required to provide a positioning member and the like that restricts the relative movement amount of the inner retainer 6 and the outer retainer 7, and the constitution of the device can be simplified.

Figure 6A:
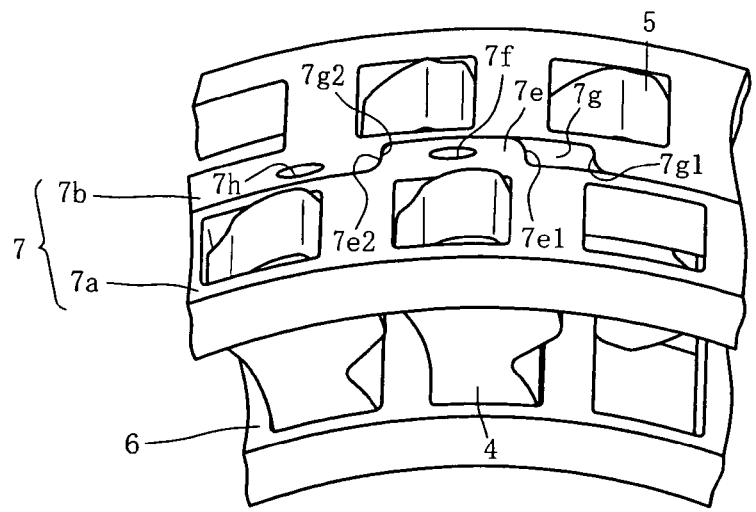
FIG. 6 (a) is a perspective view of an essential part of the first retaining section and the second retaining section that are relatively moved, (b) is a peripheral cross-sectional view of the first retaining section, and (c) is a peripheral cross-sectional view of the second retaining section.
Figure 6B:
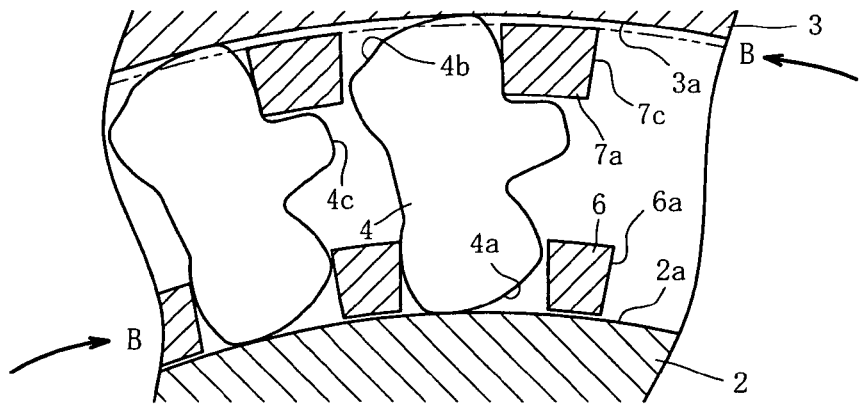
Figure 6C:
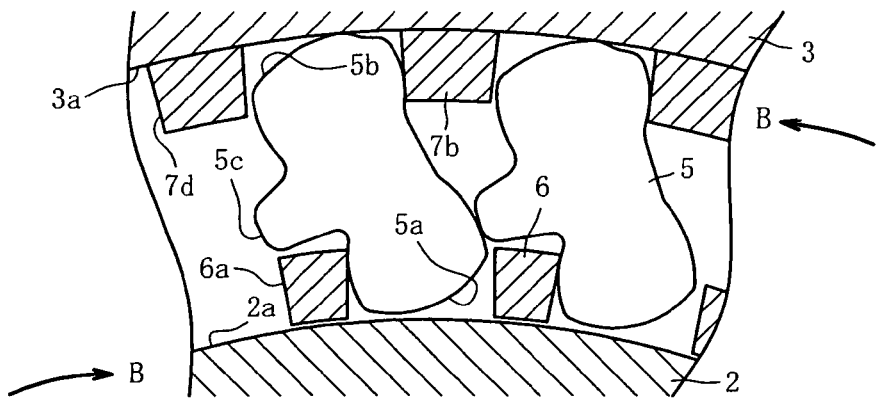

Next, the motion of the first retaining section 7a and the second retaining section 7b when the first sprags 4 strongly engage with the inner ring 2 and the outer ring 3 will be described referring to FIG. 6. FIG. 6 (a) is a perspective view of an essential part of the first retaining section 7a and the second retaining section 7b relatively moved, FIG. 6 (b) is a peripheral cross-sectional view of the first retaining section 7a, and FIG. 6 (c) is a peripheral cross-sectional view of the second retaining section 7b.

When the inner ring 2 is rotated clockwise of FIG. 5 or the outer ring 3 is rotated counterclockwise of FIG. 5 by a large torque in a state shown in FIG. 5, as shown in FIG. 6 (b), the engaging surfaces 4a, 4b of the first sprags 4 are strongly engaged with the outer peripheral surface 2a of the inner ring 2 and the inner peripheral surface 3a of the outer ring 3, and the first sprags 4 are largely tilted. Then, the first retaining section 7a is pushed by the tilting and is displaced in the circumferential direction (counterclockwise of FIG. 6). On the other hand, the second sprags 5 cannot engage with the inner ring 2 and the outer ring 3 with rotation of the inner ring 2 clockwise of FIG. 5 or with rotation of the outer ring 3 counterclockwise of FIG. 5. Therefore, the second retaining section 7b is not displaced in the circumferential direction since it is not affected by the second sprags 5. Accordingly, the displacement in the circumferential direction of the first retaining section 7a relative to the inner retainer 6 is larger than the displacement in the circumferential direction of the second retaining section 7b relative to the inner retainer 6.

Here, when the first retaining section 7a and the second retaining section 7b (the outer retainer 7) are formed integrally as a rigid body, the second retaining section 7b is displaced in the circumferential direction in response to the displacement of the first retaining section 7a. Then, the second sprags 5 may come off from the outer retainer 7, and the inner retainer 6 and the outer retainer 7 may be damaged.

However, since the first retaining section 7a and the second retaining section 7b are separated from each other in the axial direction and are constituted so as to be relatively movable in the circumferential direction, when the first sprags 4 tilt and the first retaining section 7a is pushed, only the first retaining section 7a relatively moves with respect to the second retaining section 7b until the third surface 7e2 (refer to FIG. 6 (a)) abuts upon the fourth surface 7g2. As a result, the second retaining section 7b (refer to FIG. 6 (c)) can be prevented from being affected by the displacement of the first retaining section 7a, and coming off of the second sprags 5 from the pockets 7d of the second retaining section 7b and damage of the inner retainer 6 and the second retaining section 7b can be prevented.

Figure 7A:
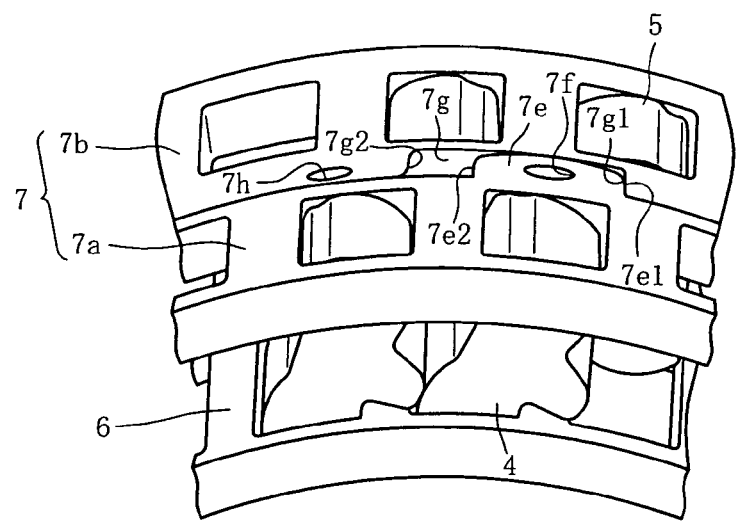
FIG. 7 (a) is a perspective view of an essential part of the first retaining section and the second retaining section whose relative movement is restricted, (b) is a peripheral cross-sectional view of the first retaining section, and (c) is a peripheral cross-sectional view of the second retaining section.
Figure 7B:
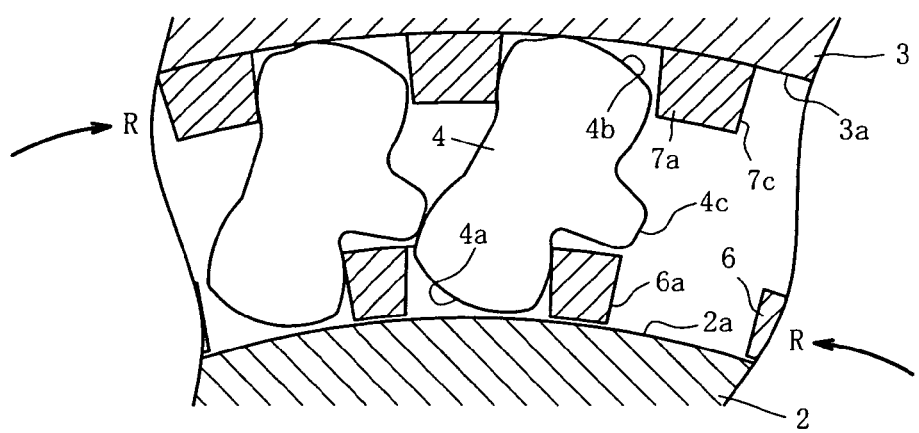
Figure 7C:
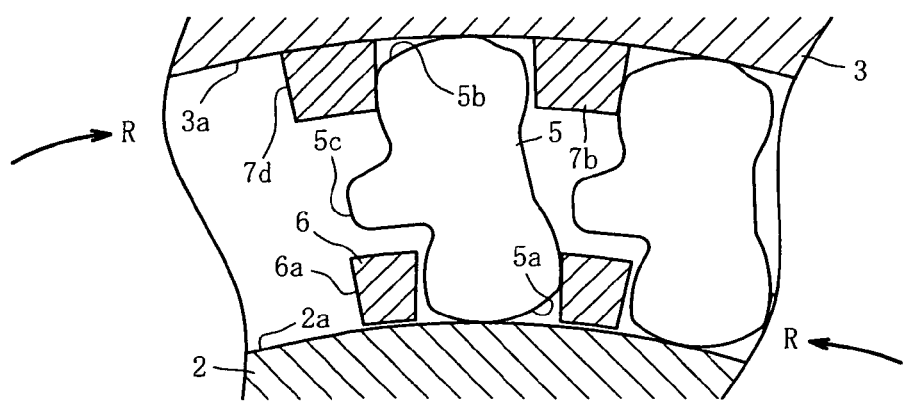

Next, the motion of the first sprags 4 and the second sprags 5 when the inner retainer 6 and the outer retainer 7 are relatively moved to the other circumferential direction (opposite direction of FIG. 5) will be described referring to FIG. 7. FIG. 7 (a) is a perspective view of an essential part of the first retaining section 7a and the second retaining section 7b whose relative movement is restricted, FIG. 7 (b) is a peripheral cross-sectional view of the first retaining section 7a, and FIG. 7 (c) is a peripheral cross-sectional view of the second retaining section 7b.

When the load application device 20 (refer to FIG. 2) is operated and a load of the arrow R direction is applied to the inner retainer 6 and the outer retainer 7 (the first retaining section 7a) respectively as shown in FIG. 7 (b) resisting the first energizing member 15 (refer to FIG. 2 and FIG. 4 (a)), the inner retainer 6 and the outer retainer 7 (the first retaining section 7a) are relatively moved, and the first sprags 4 inserted to the pockets 6a, 7c of the inner retainer 6 and the first retaining section 7a are tilted. Thus, at least one of the outer peripheral surface 2a of the inner ring 2 and the inner peripheral surface 3a of the outer ring 3 and the engaging surfaces 4a, 4b of the first sprags 4 are put in a non-contacting state. As a result, the inner ring 2 and the outer ring 3 and the first sprags 4 come to be not engageable with each other.

Also, since the second retaining section 7b moves integrally with the first retaining section 7a as described above, when a load of the arrow R direction is applied to each of the inner retainer 6 and the outer retainer 7 (the second retaining section 7b) (refer to FIG. 7 (c)) by the load application device 20 (refer to FIG. 2), the inner retainer 6 and the outer retainer 7 (the second retaining section 7b) are relatively moved, and, as a result, the second sprags 5 inserted to the pockets 6a, 7c of the inner retainer 6 and the second retaining section 7b are tilted. Thus, the engaging surfaces 5a, 5b of the second sprags 5 contact the outer peripheral surface 2a of the inner ring 2 and the inner peripheral surface 3a of the outer ring 3, and the inner ring 2 and the outer ring 3 become engageable with the second sprags 5. In this situation, the second sprags 5 are positioned at a predetermined interval in the circumferential direction between the outer peripheral surface 2a and the inner peripheral surface 3a opposing to each other without abutment of an abutting section 5c arranged so as to project toward the second sprag 5 positioned adjacently.

When power is transmitted to the inner ring 2 or the outer ring 3 in a state shown in FIG. 7 (c) and the outer ring 3 rotates clockwise of FIG. 7 or the inner ring 2 rotates counterclockwise of FIG. 7, the engaging surfaces 5a, 5b of the second sprags 5 engage with the outer peripheral surface 2a of the inner ring 2 and the inner peripheral surface 3a of the outer ring 3, and the power is transmitted via the second sprags 5.

On the other hand, as shown in FIG. 7 (b), in the first sprags 4, since at least one of the outer peripheral surface 2a of the inner ring 2 and the inner peripheral surface 3a of the outer ring 3 and the engaging surfaces 4a, 4b of the first sprags 4 are brought into a non-contacting state, the engaging surfaces 4a, 4*b* of the first sprags 4 are prevented from sliding against the outer peripheral surface 2*a* of the inner ring 2 and the inner peripheral surface 3*a* of the outer ring 3. Thus, generation of the dragging torque in the engaging surfaces 4*a*, 4*b* of the first sprags 4 can be suppressed. Also, since the engaging surfaces 4*a*, 4*b* of the first sprags 4 are prevented from sliding against the outer peripheral surface 2*a* of the inner ring 2 and the inner peripheral surface 3*a* of the outer ring 3, occurrence of wear, heat generation and the like can be suppressed.

Also, in a state where the second sprags 5 engage with the outer peripheral surface 2*a* of the inner ring 2 and the inner peripheral surface 3*a* of the outer ring 3 (refer to FIG. 7 (*c*)), the relative position of the inner retainer 6 and the outer retainer 7 is determined, and at this time, the engaging surfaces 4*a* of the first sprags 4 are brought into a non-contacting state with respect to the outer peripheral surface 2*a* of the inner ring 2 as shown in FIG. 7 (*b*). As a result, unintentional engagement of the first sprags 4 with the inner ring 2 and the outer ring 3 can be prevented when the second sprags 5 are engaged with the inner ring 2 and the outer ring 3. Thus, double locking in which both of the first sprags 4 and the second sprags 5 engage with the inner ring 2 and the outer ring 3 can be securely prevented.

Also, when the torque transmitted via the second sprags 5 increases and the inner retainer 6 and the outer retainer 7 relatively move to the arrow R direction, as shown in FIG. 7 (*b*), in the first sprag 4, the abutting section 4*c* abuts upon the first sprag 4 positioned adjacently, and further tilting is restricted. As a result, the inner retainer 6 and the outer retainer 7 (the first retaining section 7*a*) are brought into a state of holding the first sprags 4, and further relative movement of the inner retainer 6 and the outer retainer 7 (the first retaining section 7*a*) is restricted. Accordingly, it is not required to arrange a positioning member and the like that restricts the amount of relative movement of the inner retainer 6 and the outer retainer 7, thus, the constitution of the device can be simplified.

Figure 8A:
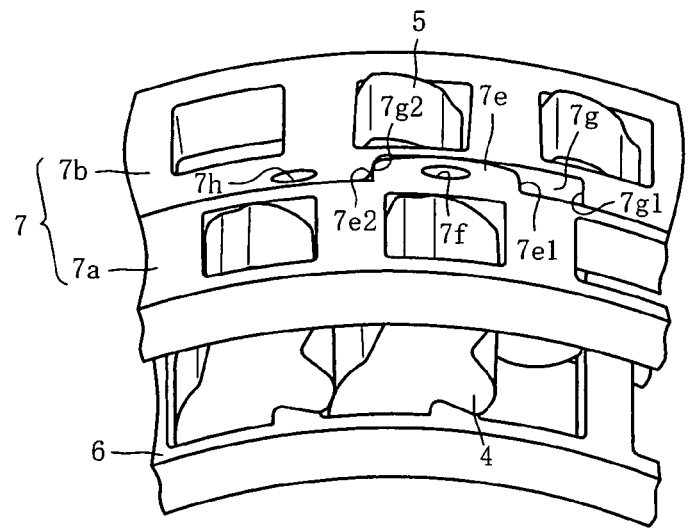
FIG. 8 (a) is a perspective view of an essential part of the first retaining section and the second retaining section that are relatively moved, (b) is a peripheral cross-sectional view of the first retaining section, and (c) is a peripheral cross-sectional view of the second retaining section.
Figure 8B:
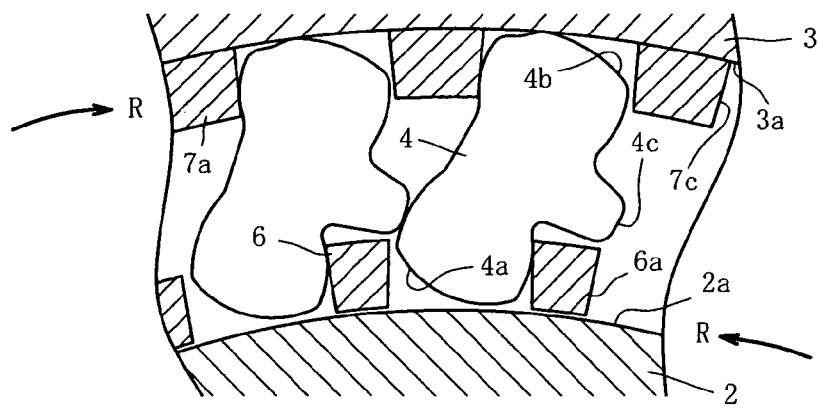
Figure 8C:
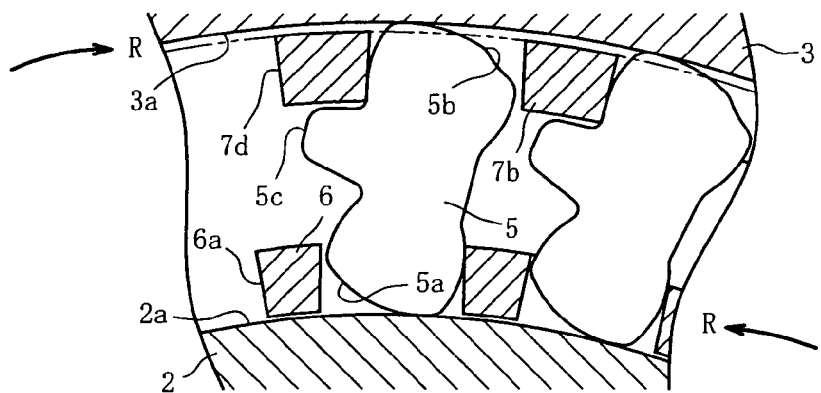

Next, the motion of the first retaining section 7*a* and the second retaining section 7*b* when the second sprags 5 strongly engage with the inner ring 2 and the outer ring 3 will be described referring to FIG. 8. FIG. 8 (*a*) is a perspective view of an essential part of the first retaining section 7*a* and the second retaining section 7*b* relatively moved, FIG. 8 (*b*) is a peripheral cross-sectional view of the first retaining section 7*a*, and FIG. 8 (*c*) is a peripheral cross-sectional view of the second retaining section 7*b*.

When the inner ring 2 is rotated counterclockwise of FIG. 7 or the outer ring 3 is rotated clockwise of FIG. 7 by a large torque in a state shown in FIG. 7, as shown in FIG. 8 (*c*), the engaging surfaces 5*a*, 5*b* of the second sprags 5 are strongly engaged with the outer peripheral surface 2*a* of the inner ring 2 and the inner peripheral surface 3*a* of the outer ring 3, and the second sprags 5 are largely tilted. Then, the second retaining section 7*b* is pushed by the tilting and is displaced in the circumferential direction (clockwise of FIG. 8). On the other hand, the first sprags 4 cannot engage with the inner ring 2 and the outer ring 3 with rotation of the inner ring 2 counterclockwise of FIG. 7 or with rotation of the outer ring 3 clockwise of FIG. 7. Therefore, the first retaining section 7*a* is not displaced in the circumferential direction since it is not affected by the first sprags 4. Accordingly, the displacement in the circumferential direction of the second retaining section 7*b* relative to the inner retainer 6 is larger than the displacement in the circumferential direction of the first retaining section 7*a* relative to the inner retainer 6.

However, since the first retaining section 7*a* and the second retaining section 7*b* are separated from each other in the axial direction and are constituted so as to be relatively movable in the circumferential direction as described above, when the second sprags 5 tilt and the second retaining section 7*b* is pushed, only the second retaining section 7*b* relatively moves with respect to the first retaining section 7*a* until the fourth surface 7*g*2 (refer to FIG. 8 (*a*)) abuts upon the third surface 7*e*2. As a result, the first retaining section 7*a* (refer to FIG. 8 (*b*)) can be prevented from being affected by the displacement of the second retaining section 7*b*, and coming off of the first sprags 4 from the pockets 7*c* of the first retaining section 7*a* and damage of the inner retainer 6 and the outer retainer 7 can be prevented.

Next, the motion of the power transmission device 1 mounted on the vehicle 100 (refer to FIG. 1) will be described referring to FIG. 9 and FIG. 10. In the vehicle 100, when the main clutch 105 is connected, the power of the engine 103 and the motor 104 is inputted from the outer ring 3 of the power transmission device 1, is outputted from the inner ring 2 to the transmission 106 via the first sprags 4 or the second sprags 5, and is transmitted to the rear wheels 102. Also, in FIG. 9 and FIG. 10, in order to facilitate understanding, the transmission route of the power is shown by the arrow P, and the rotational direction and the rotational speed of the inner ring 2 and the outer ring 3 are shown by the direction and length of the arrow T. Further, the direction of the load applied to the inner retainer 6 and the outer retainer 7 by the first energizing member 15 (refer to FIG. 2 and FIG. 4 (*a*)) of the power transmission device 1 is shown by the arrow B, and the direction of the load applied to the inner retainer 6 and the outer retainer 7 by operation of the load application device 20 (refer to FIG. 2) is shown by the arrow R. Furthermore, the direction of the relative rotation of the inner ring 2 and the outer ring 3 with which the first sprags 4 and the second sprags 5 engage with the inner ring 2 and the outer ring 3 which is the rotational direction of the inner ring 2 in the relative rotation with respect to the outer ring 3 as viewed from the outer ring 3 side is shown by the direction of the arrow Ri, and the direction of the relative rotation of the inner ring 2 and the outer ring 3 with which the first sprags 4 and the second sprags 5 engage with the inner ring 2 and the outer ring 3 which is the rotational direction of the outer ring 3 in the relative rotation with respect to the inner ring 2 as viewed from the inner ring 2 side is shown by the direction of the arrow Ro.

The motion of the power transmission device 1 when the vehicle 100 travels normally will be described first, and the motion of the power transmission device 1 in shifting up will be described next. FIG. 9 (*a*) is a schematic drawing schematically showing the inner structure of the power transmission device 1 during normal traveling, and FIG. 9 (*b*) is a schematic drawing schematically showing the inner structure of the power transmission device 1 in shifting up. In normal traveling and shifting up, the power application device 20 (refer to FIG. 2) is not operated. Thus, as shown in FIG. 9 (*a*), a load of the arrow B direction is applied to the inner retainer 6 and the outer retainer 7 by the first energizing member 15 (refer to FIG. 2 and FIG. 4 (*a*)). As a result, the first sprags 4 contact the inner ring 2 and the outer ring 3 by the inner retainer 6 and the outer retainer 7 relatively moved, and the second sprags 5 are put in a non-contacting state with respect to at least one of the inner ring 2 and the outer ring 3.

In this state, the power is transmitted to the outer ring 3 of the power transmission device 1 from the engine 103 (refer to FIG. 1) and the motor 104 via the main clutch 105. The rotational direction of the outer ring 3 to which the power has been transmitted (the arrow T direction) is to be the same direction of the direction of the relative rotation of the outer ring 3 (the arrow Ro direction) when the first sprags 4 engage with the inner ring 2 and the outer ring 3 (hereinafter referred to as "lock direction"), and is to be the opposite direction of the direction of the relative rotation of the outer ring 3 (the arrow Ro direction) when the second sprags 5 engage with the inner ring 2 and the outer ring 3 (hereinafter referred to as "free direction"). As a result, the power transmitted to outer ring 3 is transmitted to the inner ring 2 via the first sprags 4. The power transmitted to the inner ring 2 drives the rear wheels 102 via the transmission 106 (refer to FIG. 1).

Next, in shifting up, it is preferable to lower the rotational speed of the outer ring 3 that is on the engine 103 side in order to reduce the shift shock. In the power transmission device 1, the rotational speed of the outer ring 3 (the engine 103 side) can be lowered using a known means while the main clutch 105 (refer to FIG. 1) is connected. That is, as shown in FIG. 9 (b), when the rotational speed of the outer ring 3 (the arrow T) is made slower than the rotational speed of the inner ring 2 (the arrow T), the rotational direction of the inner ring 2 is the free direction (opposite of the arrow Ri direction) in the first sprags 4 and is the lock direction (the arrow Ri direction) in the second sprags 5 as viewed from the outer ring 3 side in the relative rotation with respect to the outer ring 3. However, because the second sprags 5 are in a non-contacting state with respect to at least one of the inner ring 2 and the outer ring 3, the power is not transmitted via the second sprags 5. Therefore, the rotational speed of the outer ring 3 (the engine 103 side) can be lowered without affecting the rotational speed of the inner ring 2 (the rear wheels 102 side). Thus, since a series of operations can be executed while the main clutch 105 (refer to FIG. 1) is connected, the shift operation time can be shortened.

Similarly, in the coast travel (inertial movement) in which the accelerator pedal is opened, as shown in FIG. 9 (b), drop of the rotational speed of the inner ring 2 (the rear wheels 102 side) affected by the inertia of the engine 103 and the like can be prevented. Thus, comfortable coast traveling can be achieved without deceleration of the vehicle 100 (refer to FIG. 1) by engine brake.

On the other hand, it is also possible to apply the engine brake to the vehicle 100. Referring to FIG. 10 (a), the motion of the power transmission device 1 when the vehicle 100 executes coast traveling will be described, and the motion of the power transmission device 1 in shifting down the transmission 106 (refer to FIG. 1) will be described next. FIG. 10 (a) is a schematic drawing schematically showing the inner structure of the power transmission device 1 during coast traveling, and FIG. 10 (b) is a schematic drawing schematically showing the inner structure of the power transmission device 1 in shifting down.

Figure 10A:
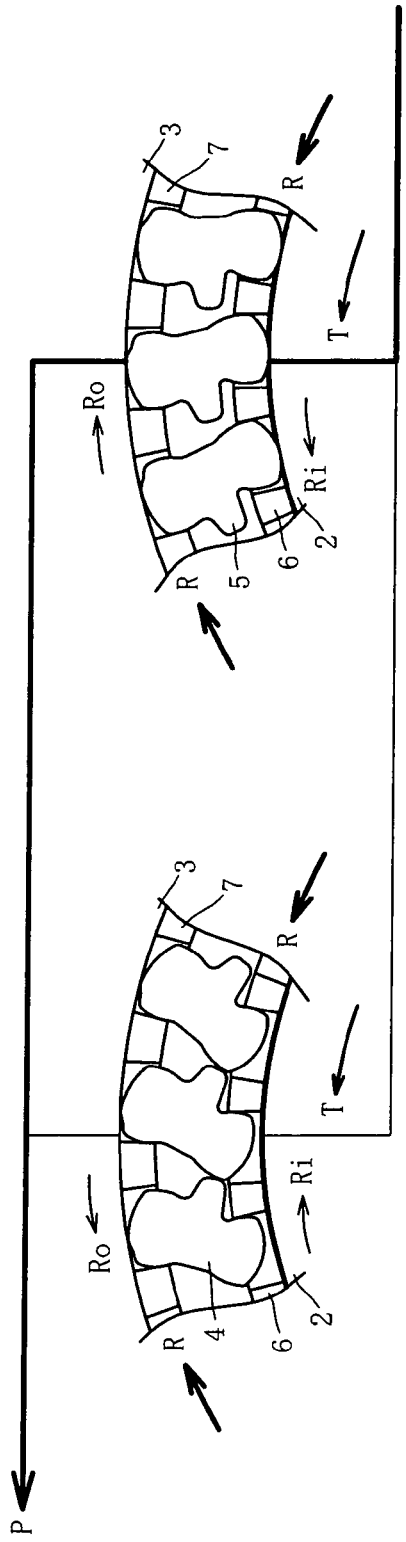
FIG. 10 (a) is a schematic drawing schematically showing the inner structure of the power transmission device during coast traveling, and (b) is a schematic drawing schematically showing the inner structure of the power transmission device in shifting down.
Figure 10B:
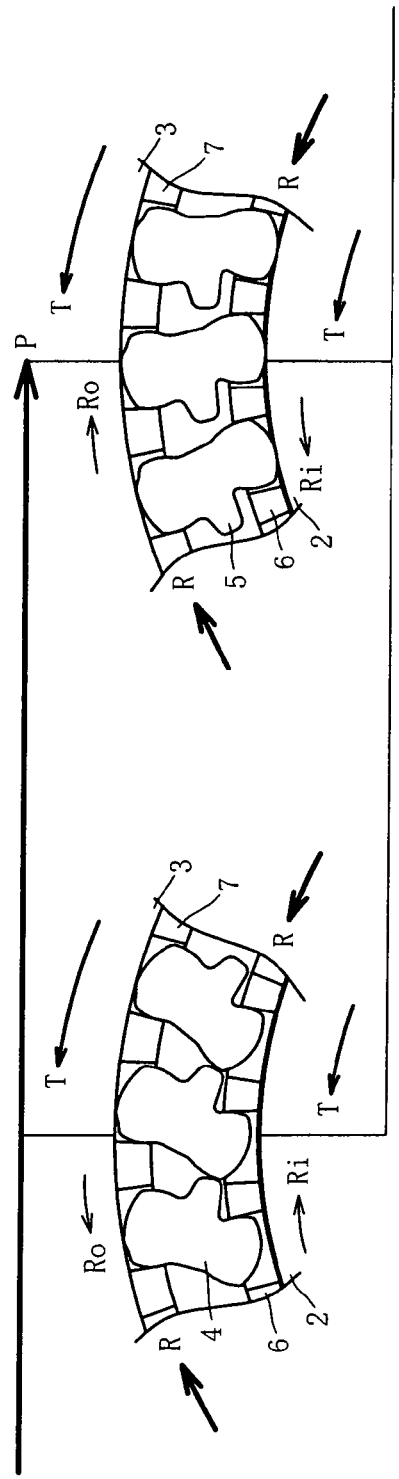

In the coast traveling in which the accelerator pedal (not shown) of the vehicle 100 (refer to FIG. 1) is opened and the engine brake is applied, in a state where the main clutch 105 is connected, the load application device 20 (refer to FIG. 2) of the power transmission device 1 is operated, a load of the arrow R direction is applied to the inner retainer 6 and the outer retainer 7 as shown in FIG. 10 (a), and the inner retainer 6 and the outer retainer 7 are relatively moved. As a result, the second sprags 5 contact the inner ring 2 and the outer ring 3 by the inner retainer 6 and the outer retainer 7 which are relatively moved, and the first sprags 4 are put in a non-contacting state with respect to at least one of the inner ring 2 and the outer ring 3.

When the vehicle 100 (refer to FIG. 1) executes coast traveling, while the power is not inputted from the outer ring (the engine 103 side) to the inner ring 2, the power is inputted from the rear wheels 102 that are rotating to the inner ring 2. The rotational direction of the inner ring 2 is counterclockwise of FIG. 10 (the arrow T direction) similarly to FIG. 9, is therefore the free direction (opposite of the arrow Ri direction) in the first sprags 4 as viewed from the outer ring 3 side in relative rotation with respect to the outer ring 3, and is the lock direction (the arrow Ri direction) in the second sprags 5 as shown in FIG. 10 (a). As a result, the power transmitted to the inner ring 2 is transmitted to the outer ring 3 via the second sprags 2. The power transmitted to the outer ring 3 is transmitted to the engine 103 and the like via the main clutch 105 (refer to FIG. 1). As a result, the rotational speed of the outer ring 3 and the inner ring 2 drops due to the inertia of the engine 103 and the like, which leads to drop of the rotational speed of the rear wheels 102. That is, the engine brake is applied.

Next, in shifting down the vehicle 100 (refer to FIG. 1), it is preferable to increase the rotational speed of the outer ring 3 (the engine 103 side) in order to reduce the shift shock. In the power transmission device 1, the rotational speed of the outer ring 3 (the engine 103 side) can be increased using a known means while the main clutch 105 is connected. That is, as shown in FIG. 10 (b), when the rotational speed of the outer ring 3 is made faster than the rotational speed of the inner ring 2, the rotational direction of the outer ring 3 is the lock direction (the arrow Ro direction) in the first sprags 4 and is the free direction (opposite of the arrow Ro direction) in the second sprags 5 as viewed from the inner ring 2 side in relative rotation with respect to the inner ring 2. However, since the first sprags 4 are in a non-contacting state with respect to at least one of the inner ring 2 and the outer ring 3 due to operation of the load application device 20 (refer to FIG. 2), the power is not transmitted via the first sprags 4. Therefore, the rotational speed of the outer ring 3 (the engine 103 side) can be increased without affecting the rotational speed of the inner ring 2 (the rear wheels 102 side). Thus, since a series of operations can be executed while the main clutch 105 (refer to FIG. 1) is connected, the shift operation time can be shortened.

Although the present invention has been described above based on the embodiments, the present invention is not limited to the embodiments described above by any means, and it can be easily surmised that a variety of improvements and modifications are possible without departing from the objects of the present invention. For example, the figures and the shapes adopted in the embodiments described above are only an example, and it is a matter of course that other figures and shapes can be employed.

Although the case in which the power transmission device 1 is mounted on the vehicle 100 has been described in the embodiments, the present invention is not necessarily limited to it, and it is a matter of course that the power transmission device 1 can be incorporated into a traveling apparatus for other vehicles (locomotive, passenger vehicle, cargo vehicle, special vehicle and the like) and a power transmission device of a working apparatus, machine tool and the like for example. Also, when the power transmission device 1 is mounted on the vehicle 100, it is a matter of course that the power source of the vehicle 100 can be at least one of the engine 103 and the motor 104.

In the embodiments described above, although the case has been described in which the inner retainer 6 and the outer retainer 7 are relatively moved so that the first sprags 4 are engaged with the outer peripheral surface 2a of the inner ring 2 and the inner peripheral surface 3a of the outer ring 3 by the first energizing member 15, the present invention is not necessarily limited to it, and it is also possible that the inner retainer 6 and the outer retainer 7 are relatively moved so that the second sprags 5 are engaged with the inner ring 2 and the outer ring 3 by reversing the direction of the energizing force applied by the first energizing member 15. Further, it is also possible that the rotational movement direction of the inner retainer 6 and the outer retainer 7 is switched alternately by omitting the first energizing member 15 and operating the load application device 20.

In the embodiments described above, although the case has been described in which the outer retainer 7 is divided into the first retaining section 7a and the second retaining section 7b, the present invention is not necessarily limited to it, and it is a matter of course that the outer retainer 7 can be one-piece and the inner retainer 6 can be divided into two of a first retaining section and a second retaining section.

In the embodiments described above, although the case was described in which the projection 7e was formed in the first retaining section 7a (refer to FIG. 5 (a)) and the recess 7g receiving the projection 7e was formed in the second retaining section 7b, the present invention is not necessarily limited to it, and it is a matter of course that the projection 7e can be formed in the second retaining section 7b and the recess 7g receiving the projection 7e can be formed in the first retaining section 7a.

In the embodiments described above, although the case has been described in which the second energizing member (not shown) energizing the first retaining section 7a (refer to FIG. 5 (a)) and the second retaining section 7b is formed of a twisting coil spring and is disposed between the inner peripheral surface of the outer retainer 7 and the outer peripheral surface of the inner retainer 6, the present invention is not necessarily limited to it. For example, it is also possible that the second energizing member is formed of an elastic body such as a synthetic rubber and the like and a compression spring, and the second energizing member is disposed between the third surface 7e2 and the fourth surface 7g2. In this case also, the first retaining section 7a and the second retaining section 7b can be energized so that the first surface 7e1 and the second surface 7g1 abut upon each other while the third surface 7e2 and the fourth surface 7g2 are made depart from each other.

In the embodiments described above, although the case has been described in which the first cam groove 10a and the second cam groove 12a formed in the first rotating section 10 (refer to FIG. 4 (a)) and the second rotating section 12 diagonally cross the straight line L parallel to the axis O, the present invention is not necessarily limited to it, and it is also possible that one of the first cam groove 10a and the second cam groove 12a is formed in parallel with the axis O, and the other is made diagonally cross the straight line L parallel to the axis O. In this case also, the inner retainer 6 and the outer retainer 7 can be relatively moved in response to the reciprocating motion of the engaging element 14.

Although the description was omitted in the embodiments described above, it is possible that an energizing member such as a ribbon spring, garter spring and the like (a third energizing member) is disposed between the outer peripheral surface 2a of the inner ring 2 and the inner peripheral surface 3a of the outer ring 3 opposing to each other, and the first sprags 4 and the second sprags 5 are energized so that the respective engaging surfaces 4a, 4b, 5a, 5b of the first sprags 4 and the second sprags 5 can engage with the outer peripheral surface 2a of the inner ring 2 and the inner peripheral surface 3a of the outer ring 3. When the third energizing member is not arranged, by reducing the dimensional tolerance of the pockets 6a, 7c, 7d of the inner retainer 6 and the outer retainer 7, the first sprags 4 and the second sprags 5 and improving the dimensional accuracy, the first sprags 4 and the second sprags 5 can be made to contact the outer peripheral surface 2a of the inner ring 2 and the inner peripheral surface 3a of the outer ring 3. However, by arranging the third energizing member, even when the dimensional tolerances of them are large, the engaging surfaces 4a, 4b, 5a, 5b of the first sprags 4 and the second sprags 5 can be made to securely contact the outer peripheral surface 2a of the inner ring 2 and the inner peripheral surface 3a of the outer ring 3 by the energizing force of the third energizing member, and the certainty of the power transmission can be improved.

Also, by reversing the direction of energization by the third energizing member, the first sprags 4 and the second sprags 5 can be energized so that the respective engaging surfaces 4a, 4b, 5a, 5b of the first sprags 4 and the second sprags 5 depart from the outer peripheral surface 2a of the inner ring 2 and the inner peripheral surface 3a of the outer ring 3. Thus, the first sprags 4 and the second sprags 5 whose engagement with the outer peripheral surface 2a of the inner ring 2 and the inner peripheral surface 3a of the outer ring 3 has been released can be prevented from unintentionally contacting the outer peripheral surface 2a of the inner ring 2 and the inner peripheral surface 3a of the outer ring 3, and transmission of power can be securely blocked.

In the embodiments described above, the case has been described in which the engaging surfaces 4a, 5a of the first sprags 4 or the second sprags 5 are brought into a non-contacting state with respect to the outer peripheral surface 2a of the inner ring 2 when one group of the first sprags 4 and the second sprags 5 is engaged with the outer peripheral surface 2a of the inner ring 2 and the inner peripheral surface 3a of the outer ring 3 (refer to FIG. 5 (c), FIG. 7 (b)). However, the present invention is not necessarily limited to it, and other configurations are also possible depending on the shape of the first sprags 4 and the second sprags 5 and the like. As other configurations, there are cases that the engaging surfaces 4b, 5b of the first sprags 4 or the second sprags 5 are brought into a non-contacting state with respect to the inner peripheral surface 3a of the outer ring 3, and that the engaging surfaces 4a, 4b, 5a, 5b of the first sprags 4 and the second sprags 5 are brought into a non-contacting state with respect to both of the outer peripheral surface 2a of the inner ring 2 and the inner peripheral surface 3a of the outer ring 3. In these cases also, double locking in which both of the first sprags 4 and the second sprags 5 engage with the inner ring 2 and the outer ring 3 can be securely prevented.

REFERENCE SIGNS LIST

1 . . . power transmission device
2 . . . inner ring
2a . . . outer peripheral surface
3 . . . outer ring
3a . . . inner peripheral surface
4 . . . first sprag
4a, 4b . . . engaging surface
5 . . . second sprag
5a, 5b . . . engaging surface
6 . . . inner retainer
7 . . . outer retainer
7a . . . first retaining section
7b . . . second retaining section
7e1 . . . first surface
7g1 . . . second surface
15 . . . first energizing member
20 . . . load application device
O . . . axis

The invention claimed is:

1. A power transmission device comprising:
   an inner ring that includes an outer peripheral surface with a circular cross-sectional shape and is configured so as to be rotatable around an axis;
   an outer ring that includes an inner peripheral surface with a circular cross-sectional shape opposing the outer peripheral surface of the inner ring and is configured so as to be rotatable around the axis;
   a plurality of first sprags that include two engaging surfaces contacting the outer peripheral surface and the inner peripheral surface respectively, are disposed in the circumferential direction between the outer peripheral surface and the inner peripheral surface opposing to each other, and are configured so that the engaging surfaces can engage with the outer peripheral surface and the inner peripheral surface by relative rotation of the inner ring and the outer ring in one direction;
   a plurality of second sprags that include two engaging surfaces contacting the outer peripheral surface and the inner peripheral surface respectively, are disposed in the circumferential direction between the outer peripheral surface and the inner peripheral surface opposing to each other along with the first sprags, and are configured so that the engaging surfaces can engage with the outer peripheral surface and the inner peripheral surface by relative rotation of the inner ring and the outer ring in the other direction;
   an outer retainer that is configured so as to be rotatable interlockingly to rotation of the inner ring or the outer ring while retaining portions on the outer ring side of the first sprags and the second sprags tiltably in the circumferential direction of the inner peripheral surface;
   an inner retainer that is configured so as to be rotatable interlockingly to rotation of the inner ring or the outer ring while retaining portions on the inner ring side of the first sprags and the second sprags tiltably in the circumferential direction of the outer peripheral surface; and
   a load application device that applies a load to at least one of the inner retainer and the outer retainer and makes the inner retainer and the outer retainer relatively rotate around the axis;
   wherein the inner retainer or the outer retainer includes:
      a first retaining section that retains the first sprags;
      a second retaining section separated in an axial direction from the first retaining section and retaining the second sprags while being relatively rotatable in a circumferential direction with respect to the first retaining section;
      a first surface and a second surface formed in the first retaining section and the second retaining section, abutting upon each other, and restricting relative movement of the first retaining section and the second retaining section to one circumferential direction; and
      a second energizing member energizing the first retaining section and the second retaining section to one circumferential direction so that the first surface and the second surface abut upon each other.

2. The power transmission device according to claim 1, wherein the inner retainer and the outer retainer retain the first sprags and the second sprags so that at least one of the outer peripheral surface of the inner ring and the inner peripheral surface of the outer ring and engaging surfaces of the first sprags or the second sprags are brought into a non-contacting state when the inner retainer and the outer retainer are relatively moved around the axis by application of a load by the load application device and engagement of at least one of the outer peripheral surface of the inner ring and the inner peripheral surface of the outer ring and engaging surfaces of the first sprags and the second sprags is released.

3. The power transmission device according to claim 2, wherein the first sprags and the second sprags are configured so that, when engaging surfaces of either of the first sprags or the second sprags and the outer peripheral surface of the inner ring and the inner peripheral surface of the outer ring are engaged, the engaging surfaces of the other of the first sprags or the second sprags and at least one of the outer peripheral surface of the inner ring and the inner peripheral surface of the outer ring are brought into a non-contacting state.

4. The power transmission device according to claim 2, further comprising:
   a first energizing member that energizes at least one of the inner retainer and the outer retainer,
   wherein the inner retainer and the outer retainer are energized to the opposite direction of the direction of relative movement of the inner retainer and the outer retainer by the load application device by being energized by the first energizing member.

5. The power transmission device according to claim 2, wherein the first sprags and the second sprags are configured so that, when engagement of at least one of the outer peripheral surface of the inner ring and the inner peripheral surface of the outer ring and the engaging surfaces of the first sprags and the second sprags is released and the first sprags and the second sprags are tilted by relative movement of the inner retainer and the outer retainer, the first sprags abut upon each other or the second sprags abut upon each other, and the first sprags and the second sprags are held by the inner retainer and the outer retainer.

6. The power transmission device according to claim 1, wherein the first sprags and the second sprags are configured so that, when engaging surfaces of either of the first sprags or the second sprags and the outer peripheral surface of the inner ring and the inner peripheral surface of the outer ring are engaged, the engaging surfaces of the other of the first sprags or the second sprags and at least one of the outer peripheral surface of the inner ring and the inner peripheral surface of the outer ring are brought into a non-contacting state.

7. The power transmission device according to claim 6, further comprising:
   a first energizing member that energizes at least one of the inner retainer and the outer retainer,
   wherein the inner retainer and the outer retainer are energized to the opposite direction of the direction of relative movement of the inner retainer and the outer retainer by the load application device by being energized by the first energizing member.

8. The power transmission device according to claim 6, wherein the first sprags and the second sprags are configured so that, when engagement of at least one of the outer peripheral surface of the inner ring and the inner peripheral surface of the outer ring and the engaging surfaces of the first sprags and the second sprags is released and the first sprags and the second sprags are tilted by relative movement of the inner retainer and the outer retainer, the first sprags abut upon each other or the second sprags abut upon each other, and the first sprags and the second sprags are held by the inner retainer and the outer retainer.

9. The power transmission device according to claim 1, further comprising:
   a first energizing member that energizes at least one of the inner retainer and the outer retainer,
   wherein the inner retainer and the outer retainer are energized to the opposite direction of the direction of relative movement of the inner retainer and the outer retainer by the load application device by being energized by the first energizing member.

10. The power transmission device according to claim 9, wherein the first sprags and the second sprags are configured so that, when engagement of at least one of the outer peripheral surface of the inner ring and the inner peripheral surface of the outer ring and the engaging surfaces of the first sprags and the second sprags is released and the first sprags and the second sprags are tilted by relative movement of the inner retainer and the outer retainer, the first sprags abut upon each other or the second sprags abut upon each other, and the first sprags and the second sprags are held by the inner retainer and the outer retainer.

11. The power transmission device according to claim 1, wherein the first sprags and the second sprags are configured so that, when engagement of at least one of the outer peripheral surface of the inner ring and the inner peripheral surface of the outer ring and the engaging surfaces of the first sprags and the second sprags is released and the first sprags and the second sprags are tilted by relative movement of the inner retainer and the outer retainer, the first sprags abut upon each other or the second sprags abut upon each other, and the first sprags and the second sprags are held by the inner retainer and the outer retainer.

* * * * *